United States Patent
Kasravi et al.

[11] Patent Number: 5,863,055
[45] Date of Patent: Jan. 26, 1999

[54] PERSONAL CART

[76] Inventors: Kasra Kasravi, 1198 Peveril, Bloomfield Hills, Mich. 48304; Suzanne M. MacDermid, 1258 Paddington, Canton, Mich. 48187

[21] Appl. No.: 922,899

[22] Filed: Sep. 3, 1997

[51] Int. Cl.[6] .................................................. B62B 1/04
[52] U.S. Cl. ..................... 280/47.29; 280/654; 280/655; 280/47.19
[58] Field of Search .................... 280/30, 47.18, 280/47.19, 47.29, 654, 655

[56] References Cited

U.S. PATENT DOCUMENTS

| | | | |
|---|---|---|---|
| 2,220,150 | 11/1940 | Goldman | 280/41 |
| 2,398,863 | 4/1946 | Sides | 280/41 |
| 2,582,435 | 1/1952 | Howard | 280/47.18 |
| 3,997,181 | 12/1976 | Jaco et al. | 280/47.19 |
| 4,441,734 | 4/1984 | Schlissel | 280/638 |
| 4,448,434 | 5/1984 | Anderson | 280/40 |
| 4,492,388 | 1/1985 | de Wit | 280/651 |
| 4,521,030 | 6/1985 | Vance | 280/42 |
| 4,523,773 | 6/1985 | Holtz | 280/654 |
| 4,526,399 | 7/1985 | Holtz | 280/655 |
| 4,765,646 | 8/1988 | Cheng | 280/651 |
| 4,865,346 | 9/1989 | Carlile | 280/654 |
| 4,989,889 | 2/1991 | Server Perez | 280/40 |
| 5,040,809 | 8/1991 | Yang | 280/42 |
| 5,072,958 | 12/1991 | Young | 280/40 |
| 5,118,130 | 6/1992 | Kaltz | 280/154 |
| 5,127,662 | 7/1992 | Spak | 280/40 |
| 5,161,811 | 11/1992 | Cheng | 280/30 |
| 5,380,033 | 1/1995 | Harling | 280/654 |
| 5,388,854 | 2/1995 | Kappaz | 280/652 |
| 5,626,352 | 5/1997 | Grace | 280/47.29 |

Primary Examiner—D. Glenn Dayoan
Assistant Examiner—Clovia Hamilton
Attorney, Agent, or Firm—Gifford, Krass, Groh, Sprinkle, Patmore, Anderson & Citkowski, P.C.

[57] ABSTRACT

A personal cart for easily transporting several shopping articles when shopping or small packages, files, tools, and other small articles by other users such as professionals. The personal cart includes a lower frame structure having a lower frame extending vertically and a lower platform pivotally connected to and extending at an angle to the lower frame. A lower platform face extends about the lower platform when the personal cart is in an open position and forms a shelf resting an object. An upper frame structure extends from and is supported by one end of the lower frame structure. The upper frame structure includes an upper frame and an upper platform pivotally connected to and extending at an angle from the upper frame. An upper platform face extends about the upper platform when the personal cart is in an open position and forms a shelf for resting additional objects. The upper platform is completely collapsible within the upper frame and lays flush with the upper frame in the collapsed position. The entire upper frame structure is then telescopically collapsible within the lower frame structure. A portable carrying case is provided for carrying the personal cart when the cart is in a completely collapsed position.

19 Claims, 4 Drawing Sheets

PERSONAL CART

BACKGROUND OF THE INVENTION

I. Field of the Invention

The present invention is directed to a personal cart for aiding shoppers to easily transport several shopping articles when shopping. The personal cart is also suitable for easily transporting small packages, files, tools and other small articles by other users such as professionals.

II. Description of the Related Art

Personal carts of the type used for carrying luggage at airports or the like are well known. Such personal carts either encompass a piece of luggage with an attached extendable handle at one end and wheels at the opposing end or are a separate cart for supporting luggage. Some of these carts are collapsible while others, such as the luggage with handle, although somewhat collapsible, take the shape no smaller than the perimeter of the luggage piece.

Alternative personal carts have been developed, however, like the personal luggage with extendable handle, these personal carts do not collapse into a shape and size small enough for carrying by the user. In fact, many airports are now preventing the personal luggage with carrier from being carried onto the airplane.

Another disadvantage of this previously known personal carts is that they provide only a single shelf for supporting and transporting objects. This becomes a great disadvantage when the objects to be transported are fragile, such as china, or fungible, such as fresh fruit or vegetables, and would be damaged if other articles were piled atop of them.

Another disadvantage of these previously known personal carts is that once filled with packages the cart must be angled onto its wheels and pulled by the user. Because the center of gravity of the cart is within the structure, the user may be strained to tilt the cart and pull the cart where the cart may be unstable and have a tendency to fall forward or sideways.

SUMMARY OF THE INVENTION

The present invention is directed to a personal cart for transporting objects that are capable of being extended between an open and closed position. The personal cart preferably includes a lower frame structure made up of a lower frame extending vertically and a lower platform pivotally connected to and extending at an angle from the lower frame. A lower platform face, preferably formed of a lightweight but strong mesh material extends about the lower platform and forms a shelf for resting an object. Locking arms extend between the lower frame and the lower platform for locking the lower platform at an angle to the lower frame. The locking arms provide additional support for keeping an object within the lower platform on the lower platform face.

An upper frame structure extends from and is supported by the lower frame structure. The upper frame structure includes an upper frame and an upper platform pivotally connected to and extending at an angle from the upper frame.

An upper platform face extends about the upper platform when the personal cart is in an open position and forms the shelf for resting additional objects. Upper locking arms extend between the upper frame and the upper frame platform for locking the upper platform at an angle to the upper frame. Like the lower locking arms, the upper locking arms provide additional support for objects placed on the upper platform face within the upper platform.

An added feature of the invention is the provision of a strap, preferably formed of a stretchable material, that may be extended from the lower platform to the upper platform for securing objects within the personal cart when the cart is in an open position. The strap fits neatly in the portable carrying case along with the personal cart when the cart is in a closed position.

An advantage of the personal cart of the present invention is the provision of these dual shelves. A still further advantage of the present invention is that the upper platform completely collapses within the upper frame structure and lays flush within the upper frame structure in this collapsed position. Upon collapsing the upper platform into the upper frame structure, the upper frame structure is then capable of being telescopically fitted within the lower frame structure creating a very small device that may be readily transported by the user in this closed position.

A portable carrying case is provided for carrying the personal cart in this closed position and doubles as a sack or bag-like structure that is attachable to the lower frame structure when the personal cart is an open position. In this way, the portable carrying case provides additional storage room for carrying additional objects when the personal cart is in an open position.

A further advantage of the personal cart of the present invention is that the upper frame structure pivots away from the personal cart at an angle from the lower frame structure when in an open and locked position. By angling the upper frame structure, the center of gravity of the personal cart is moved to the outside of the lower frame structure thereby aiding the user in pulling the cart and eliminating leveraging of the cart preceding actual use of the cart.

By providing a dual platform with lateral supports and an off-set center of gravity in a completely collapsible structure, the personal cart of the present invention overcomes the disadvantages of previously known carts and is superior to any existing design.

BRIEF DESCRIPTION OF THE DRAWING

The present invention will be more fully understood by reference to the following detailed description of the preferred embodiment of the present invention when read in conjunction with the accompanying drawing, in which like reference characters refer to like parts throughout the views, and in which.

DETAILED DESCRIPTION OF THE PREFERRED EMBODIMENT

Figure 1:
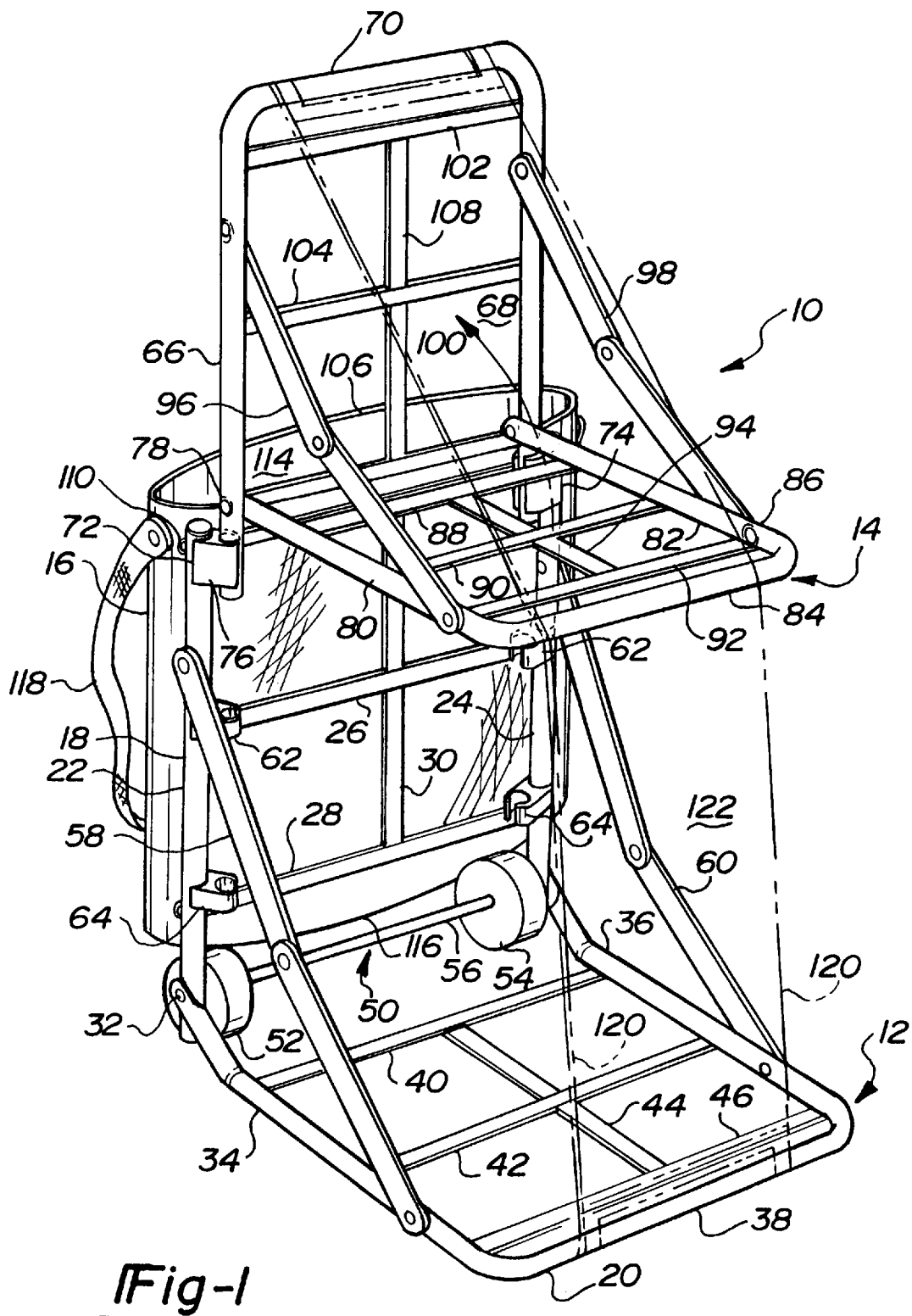
FIG. 1 is a perspective view of a personal cart in accordance with the present invention.

With reference to FIG. 1, a personal cart 10 for transporting objects is thereshown having a lower frame structure 12, an upper frame structure 14 and a portable carrying case 16 for carrying personal cart 10 when cart 10 is in a closed position.

Lower frame structure 12 includes a lower frame 18 extending vertically and a lower platform 20 pivotally connected to and extending at an angle to lower frame 18.

As best shown in FIG. 1, lower frame 18 is preferably formed by two spaced apart rods 22, 24 with mesh straps 26, 28 extending horizontally between rods 22, 24. A vertical mesh strap 30 preferably extends from horizontal strap 28 through horizontal strap 26 and joins the upper frame structure 14 to the lower frame structure 12. Mesh straps 26, 28, 30 are preferably flexible and sturdy enough to support packages and other goods being carried by the personal cart 10.

Lower platform 20 is pivotally mounted to lower frame 18 by hinge mechanism 32. Lower platform 20 is preferably formed of two spaced apart rods 34, 36 joined by a horizontal rod 38 and extends along the outer edge of lower platform 20. Rods 34, 36 are spaced apart equal to the distance between rods 22, 24. Horizontal mesh straps 40, 42 extend between rods 34, 36. Vertical strap 44 extends lengthwise between horizontal straps 40, 42 for additional support. Horizontal strap 46 extends between rods 34, 36 nearest to horizontal rod 38. This horizontal strap is also provided for the purpose of additional support.

A wheel assembly 50 extends between the rods 34, 36 of lower platform 20 and rods 22, 24 of lower frame 18. Two wheels 52, 54 are provided on either side of the frame structure and are secured by axial 56 and hinge 32. Wheel assembly 50 allows the user to readily push or pull the cart as desired.

Figure 4:
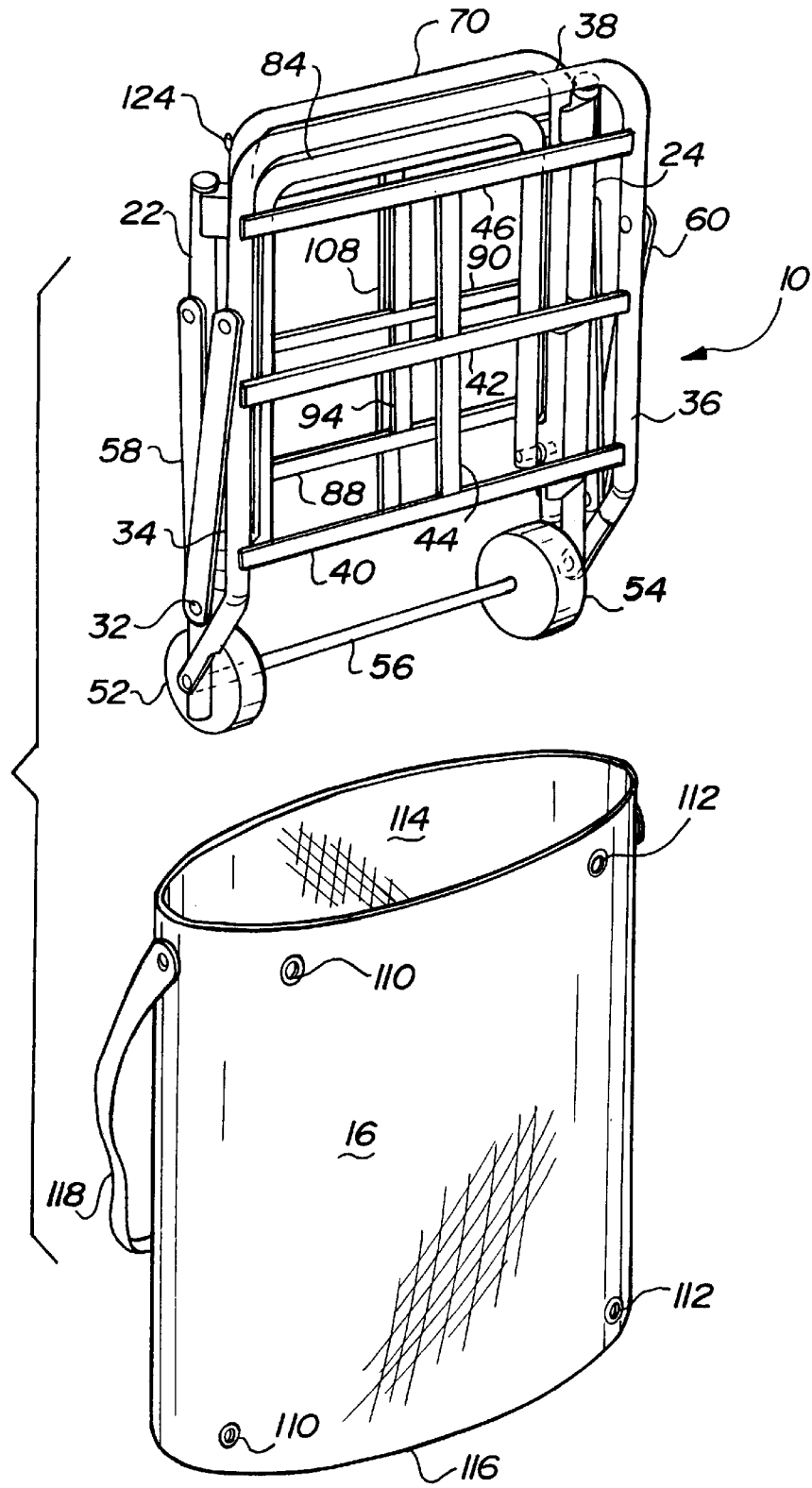
FIG. 4 is a collapsed personal cart and carrying case in accordance with the present invention.

Lower locking arms 58, 60 extend on either side of the lower frame structure between rods 22, 34 and 24, 36 to support the lower platform 20 in an open position. As is best seen in FIG. 4 and will be described in more detail later, lower platform 20 may be folded into lower frame structure about lower locking arms 58, 60. When lower platform 20 is extended and locked in an open position, mesh straps 40, 42, 44, 46 form a shelf for resting an object.

Brackets 62, 64 are provided at intermittent points along rods 22, 24 for supporting the upper frame structure 14 when the personal cart 10 is in a closed position. Brackets 62, 64 are removably attached to rods 22, 24 or may be permanently fixed to the personal cart 10 if so desired.

Figure 5:
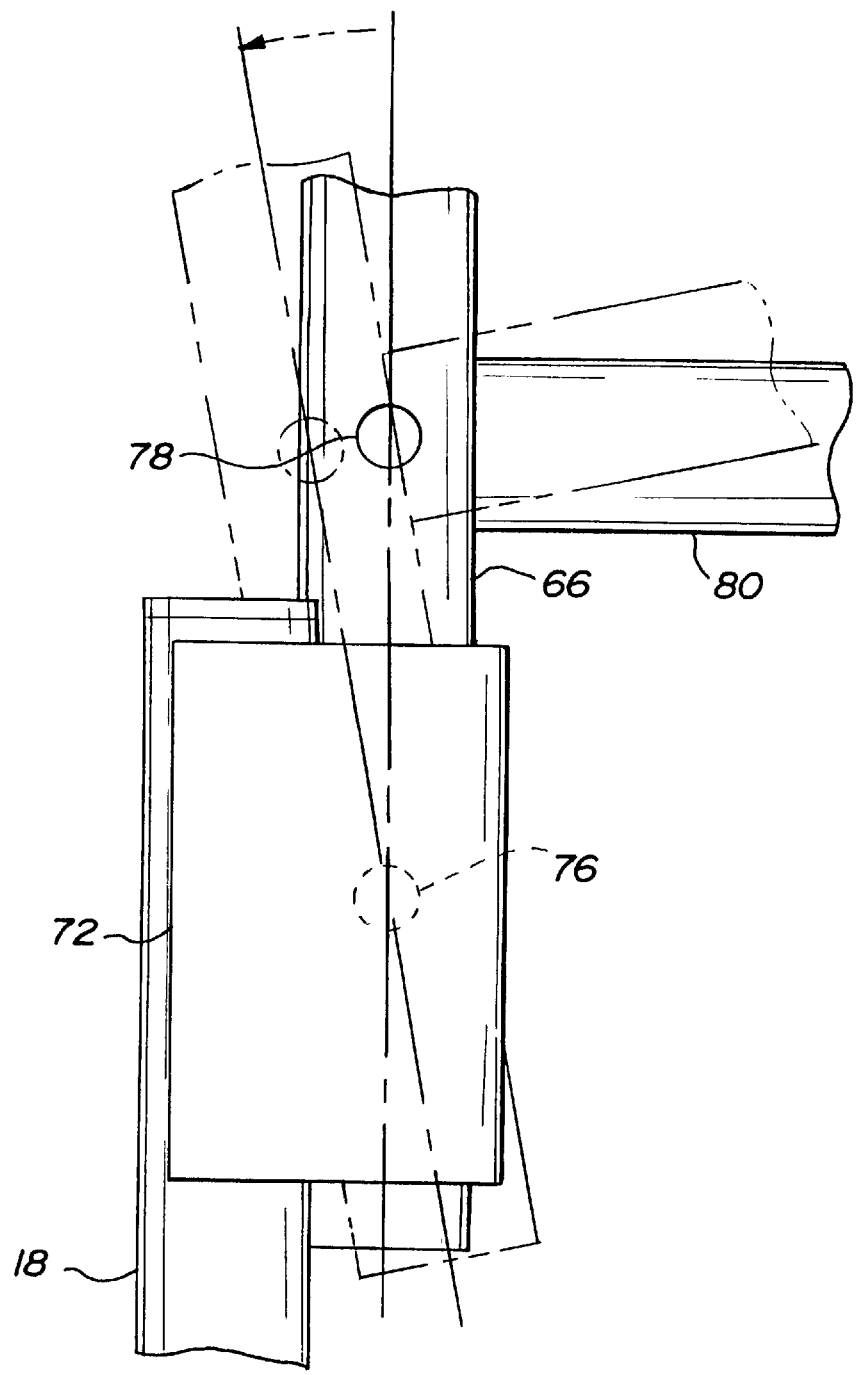
FIG. 5 is an enlarged view showing the rotation of the frame structure.

Upper frame structure 14 is formed of spaced apart rods 66, 68 extending vertically above lower frame structure 12. Horizontal rod 70 extends between vertical rods 66, 68 at the uppermost end of personal cart 10. Rods 66, 68 are removably attached to lower frame structure 12 at brackets 72, 74. Rods 66, 68 may be rotated and extended outwardly toward portable carrying case 16 about hinges 76 as best shown in FIG. 5. By extending rods 66, 68 approximately 15° beyond lower frame structure 12, the center of gravity of the personal cart 10 is shifted and allows the user to more readily tilt the personal cart 10 upon the wheel assembly 50. In this way, upper frame structure 14 may be locked at an angle about hinges 76 when in use.

Lower rods 80, 82 extend horizontally and outwardly from rods 66, 68. Lower rods 80, 82 are connected to rods 66, 68 at pins 78. Rod 84 extends between rods 80, 82 to join them in creating an upper platform 86. Mesh straps 88, 90, 92 extend between rods 80, 82. A fourth strap 94 joins straps 88, 90, 92 and gives additional support for creating an upper platform face that may be used as a shelf for resting additional objects.

Upper locking arms 96, 98 extend between rods 66, 80 and rods 68, 82 respectively. Like lower locking arms 58, 60, upper locking arms 96, 98 support the upper frame structure in an open locked position as shown in FIG. 1. As will be later described and is more readily shown in FIGS. 2 and 4, upper locking arms 96, 98 may be collapsed to close upper platform 86 into rods 66, 68, 70 about hinges 76. Rotation of upper platform 86 is indicated by arrow 100.

Additional mesh straps 102, 104, 106 extend horizontally between rods 66, 68 for additional support of objects that may be placed on upper platform 86. Strap 108 extends vertically joining horizontal straps 102, 104, 106.

Portable carrying case 16 is provided about the exterior of upper platform 86 and is removably attached to personal cart 10 by grommets 110, 112 and straps or hooks 124 (FIG. 4). Portable carrying case 16 is preferably secured to personal cart 10 about upper opening 114 along rods 66, 68. The lower portion 116 of portable carrying case 16 is preferably secured about rods 22, 24. The handle 118 extends about opening 114 and can be used to carry the portable carrying case 16 with personal cart 10 when not in use.

Stretch-like straps 120 or single expandable strap 122 may also be provided for securing packages on lower platform 20 and upper platform 86. Stretch straps 120 or 122 extend from rod 38 around rod 84 to rod 70. Thus, when packages are placed on roller platform 20 and upper platform 86, lower locking arms 58, 60 and upper locking arms 96, 98 along with stretch straps 120 or 122 secure packages on personal cart 10 when being pushed or pulled about wheel assembly 50.

Figure 2:
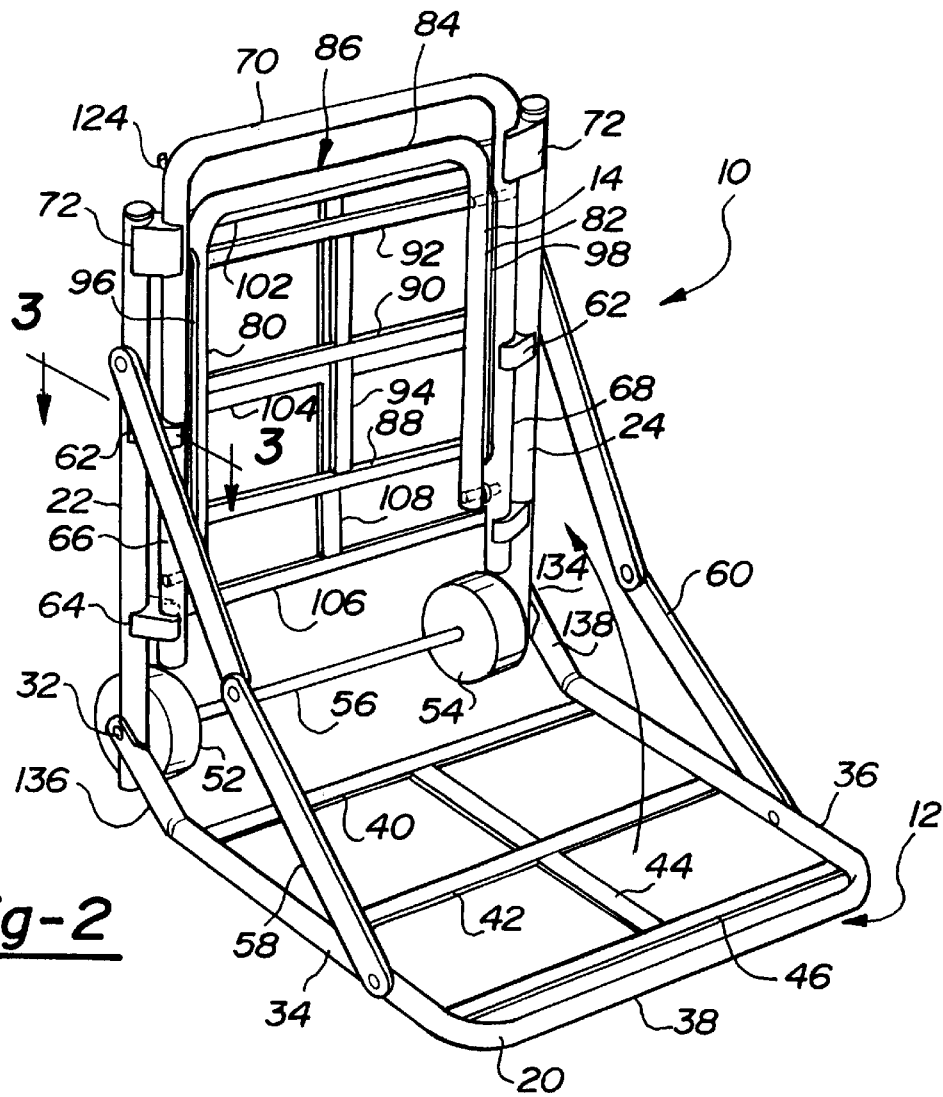
FIG. 2 shows the upper platform folded and telescoped into the lower platform of a personal cart in accordance with the present invention.
Figure 3:
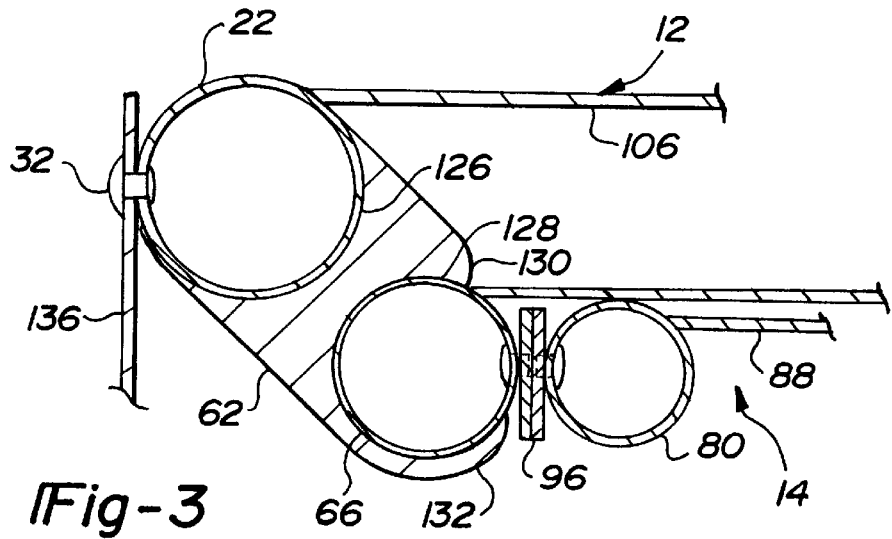
FIG. 3 is a cross-sectional view taken along line 3—3 of FIG. 2.

With reference now to FIGS. 2–4, personal cart 10 is thereshown in various forms of closure. Specifically, FIG. 2 shows upper frame structure 14 completely collapsed within itself where upper platform 86 is folded about upper locking arms 96, 98 to lie parallel with rods 66, 68. Since rods 80, 82 are spaced apart a width less than the width between rods 66, 68, upper platform 86 nests between rods 66, 68 when in a fully collapsed position.

Portable carrying case 16 is removed from its secured position where grommets 110, 112 are released from hook 124 at shown in FIG. 2.

In order for personal cart 10 to fit within portable carrying case 16, upper frame structure 14 must be completely collapsed and telescoped within lower frame structure 12. As shown in FIG. 2, therefore, upon collapsing upper platform 86 between rods 66, 68, upper frame structure 14 is telescopically fitted within lower frame structure 12 by sliding upper frame structure 14 downwardly into brackets 62, 64.

With reference to FIG. 3, a sectional view showing upper frame structure 14 collapsed and telescoped within lower frame structure 12 is thereshown. Brackets 62 comprises two openings 126, 128 having a profile identical to the exterior profile of rods 22, 66, respectively. Bracket 62 is therefore releasably secured to rod 22 by slip fitting opening 126 about rod 22. Similarly, rod 66 is snap-fit within opening 128 of bracket 62. Fingers 130, 132 are provided at opposite ends of opening 128 to allow rod 66 to slide within the opening 128. In this way, rod 66 may be pushed downward toward lower frame structure 12 while sliding readily within opening 128 due to the flexibility of fingers 130, 132.

With reference to FIG. 2, lower frame structure 12 is then rotated upwardly toward upper frame structure 14 as indicated by arrow 134. Lower locking arms 58, 60 bend inwardly to release lower frame structure 12 from its open position. Rods 34, 36 are spaced apart a greater width than rods 22, 24. Thus, rotation of lower platform 20 about hinge 32 toward upper frame structure 14 provides complete collapse of the personal cart 10 into a rectangular unit as best shown in FIG. 4. Portions 136, 138 of rods 34, 36 respectively are bent at an angle from hinge 32 toward the main body of rods 34, 36. These angled portions 136, 138 provides space to allow lower frame structure 12 to fold about upper frame structure 14.

Once personal cart 10 is completely folded and collapsed, the cart 10 may be placed within portable carrying case 16 through opening 114 as best shown in FIG. 4. This allows the user to readily carry the cart into a shopping store prior to actual use.

Once the user has entered the store and would like to carry packages, the personal cart 10 can be removed from portable carrying case 16 through opening 14. Lower frame structure 12 is then opened by grasping rod 38 and pushing downward toward wheel assembly 50. Lower locking arms 58, 60 lock lower frame structure 12 in an open position. Upper frame structure 14 is opened by pulling on rod 70 to raise the upper frame structure 14 to the position shown in FIG. 1. Bracket 72, like bracket 62 as shown in FIG. 3 has similar gripping fingers 130, 132 for holding upper frame structure 14 in the upward position shown in FIG. 1.

Rod 84 may be pushed down and away from rod 70. Upper locking arms 96, 98 retain the upper frame structure 14 in an open position.

Portable carrying case 16 may be attached to the upper frame structure 14 by hooking grommets 110, 112 to hooks 124. In order to better enable the user to pull the cart throughout a shopping center, upper frame structure 14 may be rotated about hinges 76 to displace the center of gravity of the personal cart 10 from the interior of the cart to the exterior of the cart.

Once packages are placed on the lower frame structure 12 and/or upper frame structure 14, stretch straps 120 or alternatively single expandable strap 122 may be hooked about rod 38 around rod 84 and onto rod 70 as best shown in FIG. 1.

Having described our invention, however, many modifications thereto will become apparent to those skilled in the art to which it retains without deviation from the spirit of the invention as defined by the scope of the appended claims.

We claim:

1. A personal cart for transporting objects, said cart capable of being extended between an open and closed position said cart comprising:

a lower frame structure including a lower frame extending vertically and a lower platform pivotally connected to and extending at an angle to said lower frame;

a lower platform face extending about said lower platform and forming a shelf for resting an object;

a lower locking arm extending between said lower frame and said lower platform for locking said lower platform at said angle to said lower frame;

an upper frame structure extending from and supported by one end of said lower frame structure; said upper frame structure including an upper frame and an upper platform pivotally connected to and extending at an angle to said upper frame;:

an upper platform face extending about said upper platform and forming a shelf for resting an object;

an upper locking arm extending between said upper frame and said upper frame platform for locking said upper platform at said angle to said upper frame; and a portable carrying case for carrying said personal cart when said cart is in said closed position and further comprising means for attaching said case to said lower frame structure when said personal cart is in said open position;

wherein said upper platform is foldable into a collapsed position within said upper frame and lays flush within said upper frame in said collapsed position;

wherein said upper frame with said upper platform in said collapsed position is telescopically fitted within said lower frame structure.

2. The invention as defined in claim 1, said lower locking arm further comprising means for supporting an object within said lower platform on said lower platform face.

3. The invention as defined in claim 1, said upper locking arm further comprising means for supporting an object within said upper platform on said upper platform face.

4. The invention as defined in claim 1, said personal cart further comprising a strap extending from said lower platform to said upper platform for securing said objects within said personal cart when said cart is in said open position.

5. A personal cart for transporting objects, said cart capable of being extended between an open and closed position, said cart comprising:

a lower frame structure including a lower frame extending vertically and a lower platform pivotally connected to and extending at an angle to said lower frame;

a lower platform face extending about said lower platform and forming a shelf for resting an object;

a lower locking arm extending between said lower frame and said lower platform for locking said lower platform at said angle to said lower frame;

an upper frame structure extending from and supported by one end of said lower frame structure; said upper frame structure including an upper frame and an upper platform pivotally connected to and extending at an angle to said upper frame;

an upper platform face extending about said upper platform and forming a shelf for resting an object;

an upper locking arm extending between said upper frame and said upper frame platform for locking said upper platform at said angle to said upper frame;

wherein said upper platform is foldable into a collapsed position within said upper frame and lays flush within said upper frame in said collapsed position whereby said upper frame with said upper platform in said collapsed position is telescopically fitted within said lower frame structure.

6. The invention as defined in claim 5, said lower locking arm further comprising means for supporting an object within said lower platform on said lower platform face.

7. The invention as defined in claim 5, said upper locking arm further comprising means for supporting an object within said upper platform on said upper platform face.

8. The invention as defined in claim 5, said personal cart further comprising a strap extending from said lower platform to said upper platform for securing said objects within said personal cart when said cart is in said open position.

9. The invention as defined in claim 5, and further comprising a portable carrying case for carrying said personal cart when said cart is in said closed position and further comprising means for attaching said case to said lower frame structure when said personal cart is in said open position.

10. The invention as defined in claim 5, wherein said upper frame structure pivots away from said personal cart to a position whereby the center of gravity of said personal cart is outside said lower frame structure.

11. A personal cart for transporting objects, said cart capable of being extended between an open and closed position said cart comprising:

a lower frame structure including a lower frame extending vertically and a lower platform pivotally connected to and extending at an angle to said lower frame;

a lower platform face extending about said lower platform and forming a shelf for resting an object;

a lower locking arm extending between said lower frame and said lower platform for locking said lower platform at said angle to said lower frame;

an upper frame structure extending from and supported by one end of said lower frame structure; said upper frame structure including an upper frame and an upper platform pivotally connected to and extending at an angle to said upper frame;

wherein said upper frame structure pivots away from said personal cart to a position whereby the center of gravity of said personal cart is outside said lower frame structure when said personal cart is in said open position;

wherein said upper frame with said upper platform in said collapsed position is telescopically fitted within said lower frame structure.

12. The invention as defined in claim 11 and further comprising an upper platform face extending about said upper platform and forming a shelf for resting an object.

13. The invention as defined in claim 11 and further comprising an upper locking arm extending between said upper frame and said upper frame platform for locking said upper platform at said angle to said upper frame.

14. The invention as defined in claim 11 and further comprising a portable carrying case for carrying said personal cart when said cart is in said closed position and further comprising means for attaching said case to said lower frame structure when said personal cart is in said open position.

15. The invention as defined in claim 11, said lower locking arm further comprising means for supporting an object within said lower platform on said lower platform face.

16. The invention as defined in claim 11, said upper locking arm further comprising means for supporting an object within said upper platform on said upper platform face.

17. The invention as defined in claim 11, said personal cart further comprising a strap extending from said lower platform to said upper platform for securing said objects within said personal cart when said cart is in said open position.

18. The invention as defined in claim 11, wherein said upper platform is foldable into a collapsed position within said upper frame and lays flush within said upper frame in said collapsed position.

19. A personal cart for transporting objects, said cart capable of being extended between an open, functioning position and a closed position, said cart comprising:

a lower frame structure including a lower frame extending in a vertical plane and a lower platform pivotally connected to and extending at an angle to said lower frame;

a lower platform face extending about said lower platform and forming a shelf for resting an object;

a lower locking arm extending between said lower frame and said lower platform for locking said lower platform at an angle to said lower frame;

an upper frame structure extending from and supported by one end of said lower frame structure; said upper frame structure including an upper frame and an upper platform pivotally connected to and extending at an angle to said upper frame;

wherein said upper frame structure pivots outwardly at an acute angle to said vertical plane of said lower frame to a position whereby the center of gravity of said personal cart is outside said lower frame structure when said personal cart is in said functioning position.

* * * * *